United States Patent
Harada

[11] Patent Number: 5,370,089
[45] Date of Patent: Dec. 6, 1994

[54] LUBRICATION SYSTEM FOR TWO-STROKE ENGINE

[75] Inventor: Keiichi Harada, Iwata, Japan

[73] Assignee: Yamaha Hatsudoki Kabushiki Kaisha, Iwata, Japan

[21] Appl. No.: 189,210

[22] Filed: Jan. 31, 1994

[30] Foreign Application Priority Data

Feb. 3, 1993 [JP] Japan .................. 5-039412

[51] Int. Cl.⁵ ................................ F01M 1/16
[52] U.S. Cl. ................. 123/73 AD; 184/6.22; 123/196 M
[58] Field of Search ............ 184/6.22, 6.4, 6.1; 123/73 AD, 196 M, 196 R

[56] References Cited

U.S. PATENT DOCUMENTS

| | | | |
|---|---|---|---|
| 4,114,571 | 9/1978 | Ruf | 184/6.22 |
| 4,393,854 | 7/1983 | Tacquet | 123/576 |
| 4,458,642 | 7/1984 | Okubo et al. | 184/6.22 |
| 4,616,609 | 10/1986 | Munch et al. | 123/196 R |
| 4,932,370 | 6/1990 | Schierling et al. | 123/73 AD |

FOREIGN PATENT DOCUMENTS

| | | | |
|---|---|---|---|
| 0426884 | 5/1991 | European Pat. Off. | 184/6.22 |
| 60-53608 | 3/1985 | Japan | 184/6.22 |
| 61-229914 | 10/1986 | Japan | 184/6.22 |
| 1-280610 | 11/1989 | Japan | 184/6.22 |
| 3-242410 | 10/1991 | Japan | 184/6.22 |

*Primary Examiner*—David A. Okonsky
*Attorney, Agent, or Firm*—Knobbe, Martens, Olson & Bear

[57] ABSTRACT

A direct lubricating system for a machine such as a cycle internal combustion engine wherein the lubricant is delivered directly to the sliding surfaces of the engine to be lubricated. A less viscous fluid such as fuel is mixed with the lubricant so as to ensure good distribution and the desired viscosity.

18 Claims, 4 Drawing Sheets

LUBRICATION SYSTEM FOR TWO-STROKE ENGINE

BACKGROUND OF THE INVENTION

This invention relates to a lubrication system for a machine and more particularly, to an improved lubrication system for a two-stroke internal combustion engine.

As is well-known, most mechanisms that employ moving parts require some form of lubrication. This is particularly true with machines which have variable volume defined by relatively movable components such as pumps or internal combustion engines. Some of these mechanisms include what might be considered to be closed lubricating systems wherein the lubricant is supplied to the moving parts and then is recirculated back to a supply tank for subsequent circulation. Other types of mechanisms, such as two-cycle engines, however, consume the lubricant during their operation.

For example, the traditional way in which two-cycle engines have been lubricated is to mix the fuel with the lubricant and introduce it to the crankcase chamber of the engine so that the components of the engine will be contacted by the fuel and lubricant and will thus be lubricated. However, it is also well-known that the amount of lubricant required does not vary necessarily in the same proportion as the amount of fuel required. In addition, there are disadvantages in requiring the operator to mix lubricant with the fuel.

There has been proposed, therefore, so-called direct lubricating systems for two-cycle engines wherein lubricant is supplied to the engine from a separate lubricating system. One place where the lubricant is introduced is to the sliding surface of the piston, normally through a port formed in the cylinder wall at a point below the bottom dead center position of the piston. There are, however, some disadvantages with this type of system under some circumstances.

Under many running conditions, the amount of lubricant which is required is quite small and with the type of system wherein the lubricant is supplied to the piston through an opening in the cylinder wall, the small amount of lubricant may not be able to flow sufficiently around the entire piston skirt. The use of multiple ports, although it offers one solution to this problem, is not completely satisfactory because of the small amounts of lubricant which may be required under certain running conditions.

In addition to these disadvantages, the supply of lubricant through a port in the cylinder wall can give rise to high lubricant concentrations at certain areas and this lubricant may break down under high temperatures and form deposits which can cause subsequent sticking of the piston.

It is, therefore, a principal object of this invention to provide an improved lubricating system for a machine.

It is a further object of this invention to provide an improved lubricating system for a two-cycle engine.

It is another object of the invention to provide an improved direct lubricating system for a two-cycle engine wherein the viscosity of the lubricant may be varied to suit varying running conditions.

SUMMARY OF THE INVENTION

This invention is adapted to be embodied in a lubricating system for a ported machine that comprises a pair of relatively movable members which define at least one chamber having a volume which cyclically varies upon the relative movement between the members. At least one port is formed in one of the members and is opened and closed upon the relative movement of the members. The members have engaging surfaces. Means are provided for introducing lubricant through one of the members for lubricating the engaging surfaces of the members. Means are also provided for introducing a less viscous fluid through one of the members in proximity to the point where the lubricant is introduced for controlling the viscosity of the lubricant and improving its circulation and dispersion.

DETAILED DESCRIPTION OF THE PREFERRED EMBODIMENTS OF THE INVENTION

Figure 1:
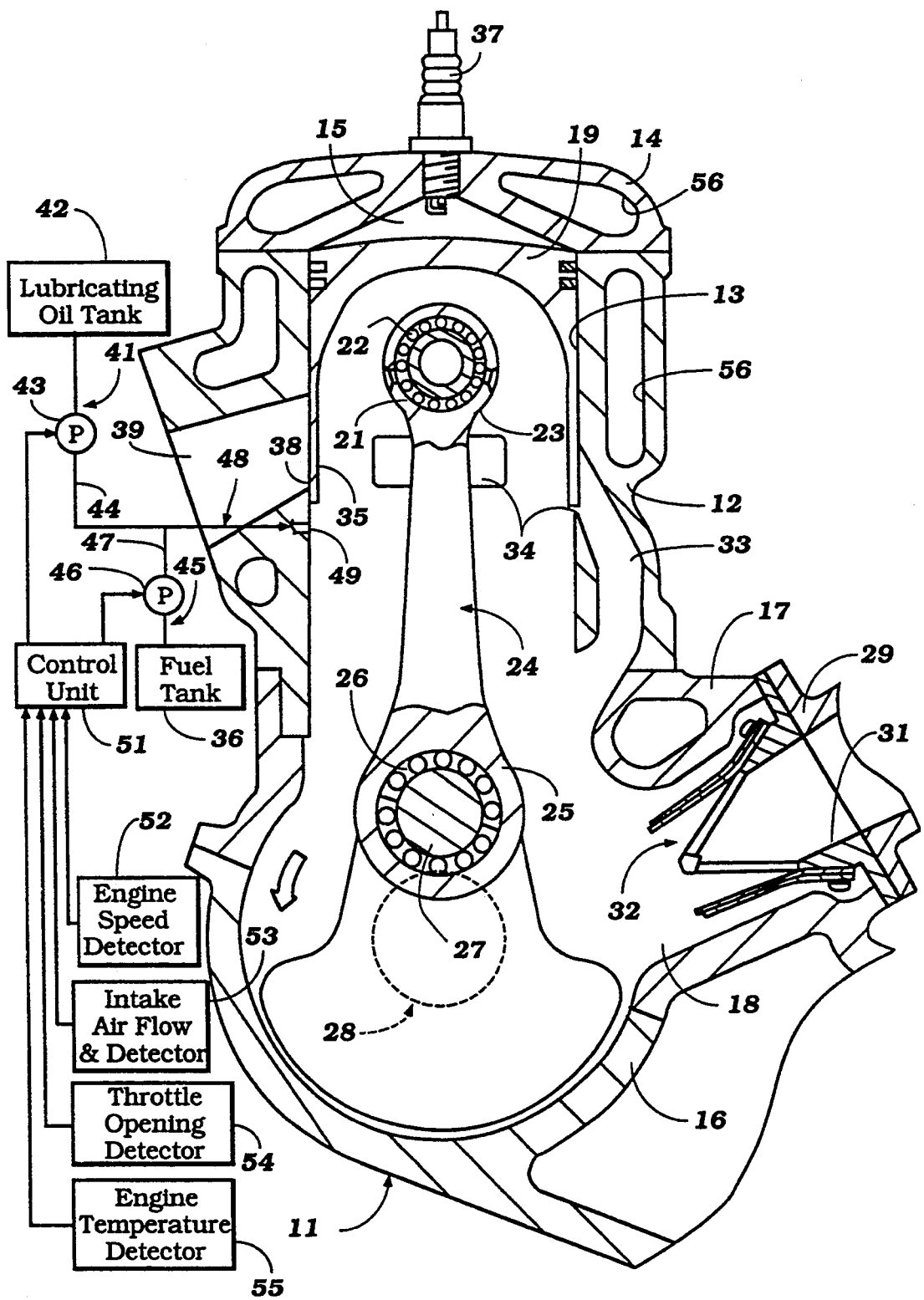
FIG. 1 is a cross-sectional view taken through a single cylinder of a multiple cylinder, two cycle, crankcase compression internal combustion engine having a lubrication system constructed in accordance with an embodiment of the invention, with certain of the components being shown schematically.

Referring now in detail to the drawings and initially primarily to FIG. 1, a two-stroke, crankcase compression internal combustion engine constructed in accordance with an embodiment of the invention is indicated generally by the reference numeral 11. Although the invention is described in conjunction with a two-stroke crankcase compression reciprocating engine, it is to be understood that the invention may be employed in conjunction with engines operating on other than the two-stroke principle or on other types of machines including machines other than engines. The invention, however, has particular utility with two-cycle crankcase compression engines. Also, the invention is described by reference to only a single cylinder of the engine because it is believed to be readily apparent to those skilled in the art how the invention may be employed in conjunction with multiple cylinder engines.

The engine 11 is comprised of a cylinder block 12 having one or more cylinder bores 13 which are closed at one end by a cylinder head 14 that is detachably connected to the cylinder block 12 in any known manner. The cylinder head 14 is provided with recesses 15 in its lower surface which cooperate with the cylinder bores 14 to form the combustion chambers of the engine.

The end of the cylinder bore 13 opposite from the cylinder head 14 is closed in part by a lower crankcase member 16 which, like the cylinder head 14, is affixed to the cylinder block 12 in any known manner. An upper crankcase member 17 is also connected to the crankcase member 16 and cylinder block 12 so as to complete the formation of a crankcase chamber, indicated generally by the reference numeral 18.

A piston 19 is slidably supported in the cylinder bore 13. A piston pin 21 with interposed bearings 22 interconnects the piston 19 to the upper or small end 23 of a connecting rod, indicated generally by the reference numeral 24. The connecting rod 24 has a lower or big end 25 that is connected by means of a bearing assembly 26 to a throw 27 of a crankshaft, indicated generally by the reference numeral 28. The crankshaft 28 is rotatably journalled within the crankcase chamber 18 in any well-known manner. If the engine 11 is of the multiple cylinder type, the crankcase chamber 18 associated with each cylinder bore 13 will be sealed suitably from the others, as is well-known in crankcase compression internal combustion engines.

At least an intake air charge is delivered to the crankcase chamber 18 by an induction system that is comprised of a throttle body, shown partially and indicated by the reference numeral 29. The throttle body 29 includes a throttle valve (not shown) and an air intake device (also not shown) that draw atmospheric air and deliver it to an intake port 31 formed in the upper crankcase member 17. A read-type check valve assembly, indicated generally by the reference numeral 32 is provided in the intake port 31 so as to permit the intake air charged to flow into the crankcase chamber 18 when the piston 19 is moving upwardly but to preclude reverse flow when the piston 19 is moving downwardly so as to compress the charge in the crankcase chamber 18.

The charge which has been drawn into the crankcase chamber 18 through the induction system as thus far described is, as noted, compressed as the piston 19 moves downwardly and then is transferred to the area above the piston 19 through one or more scavenge passages 33 which are formed in the cylinder block 12 and which terminate in scavenge ports 34 formed circumferentially around the cylinder bore 13. These scavenge ports 34 are opened and closed by a skirt 35 of the piston 19 in a well-known manner.

Means (not shown) are provided for delivering fuel to the combustion chamber which is formed in part by the cylinder head recess 15. This may be any known type of charge former such as a carburetor which forms a portion of the throttle body 29, a fuel injector which can inject air either into the induction system, the crankcase chamber 18, scavenge passages 33 or directly into the cylinder head recesses 15. If desired, air/fuel injection may also be employed. Although the particular type of charge-forming system incorporated is not an important feature of the invention, it should be noted that the fuel is supplied to the charge former from a fuel tank shown schematically in FIG. 1 and indicated by the reference numeral 36.

The fuel air charge which is then formed in the combustion chamber 15 is fired by means of a spark plug 37 mounted in the cylinder head 14 in a known manner. Although the invention is described in conjunction with a spark-ignited engine, it is to be understood that the invention may also be employed with diesel engines or, for that matter, other types of machines than internal combustion engines.

The charge which then burns and expands will drive the piston 19 downwardly for effecting rotation of the crankshaft 38. As the piston 19 moves downwardly, it will eventually open an exhaust port 38 formed at one end of an exhaust passage 39 which is formed in the cylinder block 12. This exhaust passage 39 communicates with an exhaust manifold (not shown) for discharge of the exhaust gases to the atmosphere in any well-known manner.

The construction of the engine 11 as thus far described may be considered to be conventional and, for that reason, further details of the basic engine construction are not believed to be necessary to understand the construction and operation of the invention, which relates to the lubrication system for the engine and specifically the sliding surfaces of the piston 19 and mating surface of the cylinder block 12 defined by the cylinder bore 13.

The lubricating system includes a lubricating supply portion, indicated generally by the reference numeral 41 which includes a source of lubricant such as a lubricant supply tank 42 from which lubricant is drawn by a lubricant pump 43. The lubricant pump 43 may be a positive displacement pump which has the amount of lubricant supplied varied by changing the number of cycles which the pump 43 is driven in a given time period or for a given number of rotations of the crankshaft 28. Other means for varying the amount of lubricant supplied can be employed. The lubricant pump 43 discharges lubricant to a lubricant supply conduit 44.

The system also includes an arrangement for controlling the viscosity of the lubricant supplied to the engine by mixing the lubricant with a lower viscosity fluid. Since the invention is employed with an engine operating on a gasoline fuel, this lower viscosity fluid can be the fuel which is also drawn from the fuel tank 36 and this system is indicated generally by the reference numeral 45.

The system further includes a fuel pump 46 which is separate from the fuel pump for the charge-forming system and which, like the oil pump 43, may be a positive displacement pump so as to control the amount of fuel mixed with the lubricant by controlling the number of pumping cycles either in a given time interval or for a given number of rotations of the crankshaft 28. The fuel pumped by the fuel pump 46 is delivered through a conduit 47 with the conduits 44 and 47 being, in this embodiment, interconnected with a supply conduit 48 which terminates in a discharge port 49 that is formed in the wall of the cylinder block 12 terminating at the cylinder bore 13 at a point below the bottom dead center position of the piston that will communicate directly with the skirt 35 of the piston when the piston is at or near bottom dead center and for a major portion of its stroke.

The lubricating system further includes a control unit, indicated generally by the reference numeral 51 which controls the operation of the lubricant pump 43 and fuel pump 46 so as to provide the desired amounts of fuel and lubricant mixture for achieving the desired viscosity and appropriate lubrication of the engine. This ratio control will be described later by particular reference to FIGS. 2 and 3.

The control unit 51 receives signals from certain detectors indicative of engine conditions and, if desired, ambient conditions. In the illustrated embodiment, these detectors include an engine speed detector 52 which provides an indication of speed of the engine or speed of the crankshaft 28. Any known type of detector can be employed for this purpose. In addition, there is provided an intake air flow detector, indicated schematically at 53 which may be of any known type and may be of the type which measures intake air volume by measuring the pressure in the crankcase chambers 18. There is also provided a throttle opening detector 54 that indicates the position of the throttle valve of the throttle body 29 so as to provide an indication of load on the engine. Finally, in the illustrated embodiment, there is provided an engine temperature detector 54 which senses the operating temperature of the engine, particularly by measuring the temperature of the coolant in the cooling jacket 56 of the cylinder block 12 or cylinder head 14 in a known manner. In this embodiment, the engine 11 is watercooled. Although these particular parameters are sensed, it will be readily apparent to those skilled in the art that other ambient or engine conditions may be also measured in order to control not only the amount of lubricant supplied but also the ratio of fuel to lubricant so as to control the viscosity of the lubricant.

Figure 2:
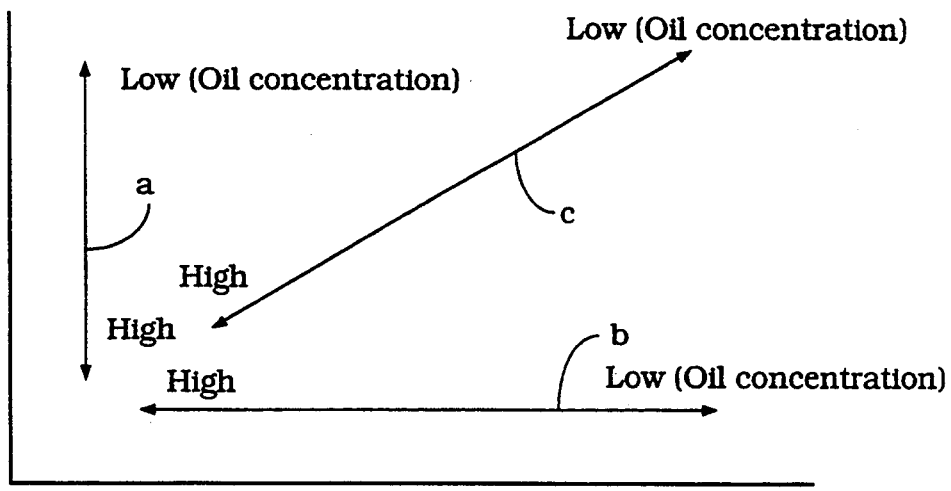
FIG. 2 is a graphical view showing the fuel/lubricant ratio in response to variations in engine speed and engine load in accordance with different types of control routines.

Referring to FIG. 2, there are three curves shown, a, b and c. Each curve indicates the ratio of fuel flowing from the fuel pump 46 through the conduit 47 to the lubricant flow from the pump 43 to the conduit 44. The curve a shows a condition wherein the ratio is controlled only in response to engine speed with the ratio being lowered as the engine speed increases so as to in effect increase the amount of lubricant and decrease the viscosity. The curve b shows a control strategy wherein the concentration is varied only in response to engine load and regardless of engine speed. As the engine load increases, the ratio of fuel to oil is decreased so as to provide more lubricant and a higher viscosity as the load increases. The curve c shows a curve which is blended between engine speed and engine load and again, the ratio of fuel to lubricant is decreased as speed and load increased so as to increase the amount of oil concentration.

As has been previously noted, the amount of lubricant and fuel supplied and their ratios is accomplished by varying either the number of pumping cycles for the pumps 43 and 46 in a given time period or for a given number of rotations of the crankshaft or in any other suitable manner.

Figure 3:
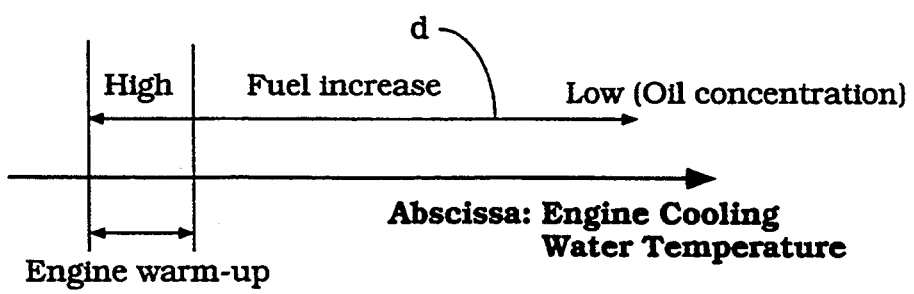
FIG. 3 is a graphical view showing fuel to lubricant ratio in response to engine temperature in accordance with another control routine.
Figure 4:
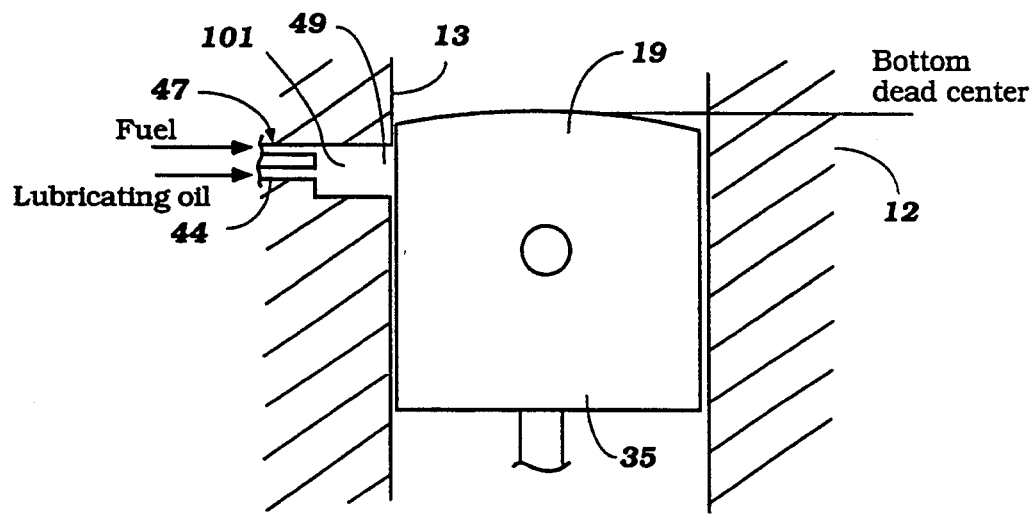
FIG. 4 is a partially schematic cross-sectional view showing one embodiment of the invention.

Still another control routine is shown in FIG. 3 and this shows varying the viscosity of the lubricant in response to the engine temperature in accordance with the curve d. When the engine is at a low temperature, the viscosity of the lubricant is reduced by increasing the ratio of fuel to lubricant and as the engine warms up, the viscosity is increased by decreasing the amount of fuel in relation to the amount of lubricant supplied in a given time period.

Obviously, in addition to controlling the viscosity, the total amount of lubricant supplied to the engine is controlled in response to any type of control routine as is known in this art. Also, in addition to changing the ratio of fuel to lubricant by changing both the amount of lubricant supplied and the amount of fuel supplied, the amount of fuel supplied may be held constant and lubricant amount changed or the amount of lubricant can be held fixed and the amount of fuel supplied varied. Again, it is to be understood that this is done for a given condition and the total amount of lubricant supplied to the engine will be controlled in accordance with another routine of any known type.

A number of various ways can be employed for mixing the fuel with the lubricant and some typical embodiments are depicted in FIGS. 4, 5, 6 and 7 and will now be described by reference to those figures. These figures show only the cylinder block 12 and piston 19 in the area where the lubricant discharge port 49 is positioned.

In the first of these embodiments, the fuel supply conduit 47 and lubricant supply conduit 44 extend generally parallel to each other through the cylinder block 12 and merge into a mixing chamber 101 formed at the base of the discharge port 49. The mixing chamber 101 will have adequate volume so as to ensure that the fuel and lubricant will be mixed before introduced to the skirt 35 of the piston 19.

Figure 5:
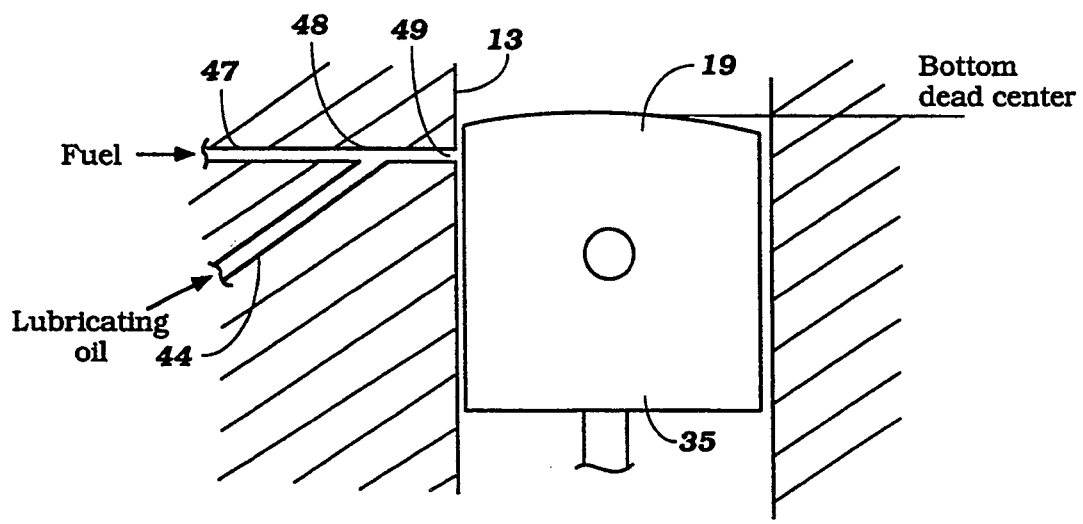
FIG. 5 is a partial cross-sectional view, in part similar to FIG. 4, and shows a further embodiment of the invention.

FIG. 5 shows another simpler embodiment like that of FIG. 1 wherein the fuel supply conduit 47 extends without interruption to the port 49 and is intersected somewhere upstream of the supply port 49 by the lubricant oil passage 44. Hence, the fuel and lubricant will be mixed before they are delivered to the skirt 35 of the piston 19.

Figure 6:
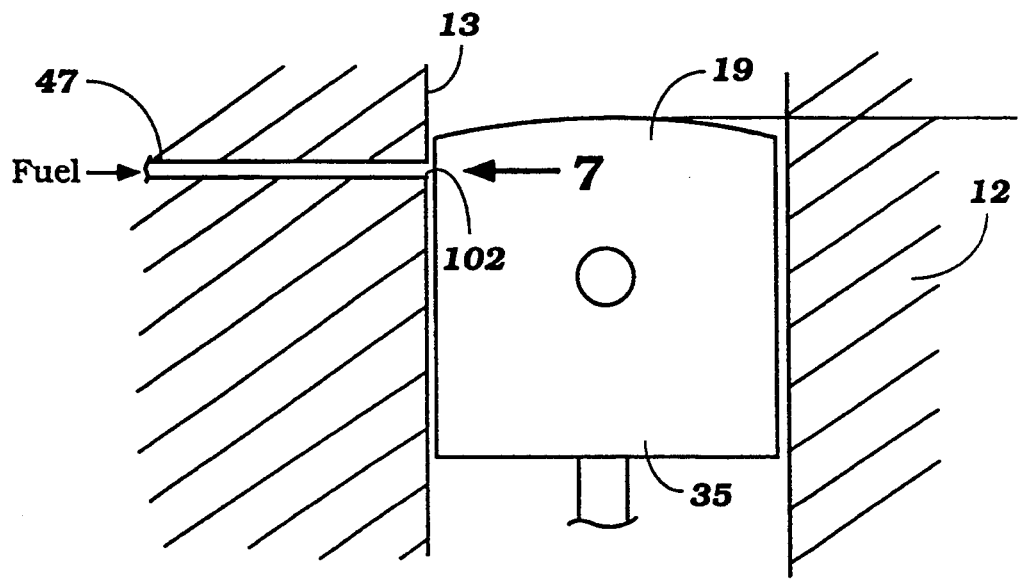
FIG. 6 is a partial cross-sectional view, in part similar to FIGS. 4 and 5, and shows yet another embodiment of the invention.
Figure 7:
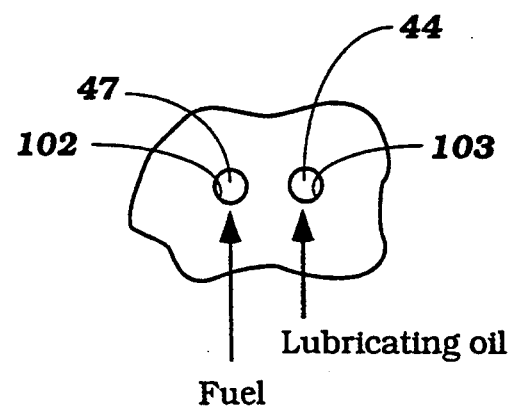
FIG. 7 is an enlarged developed view looking generally in the direction of the arrow 7 in FIG. 6.

FIGS. 6 and 7 show another embodiment wherein the mixing of the fuel and lubricant takes place directly on the skirt 35 of the piston 19 rather than within the cylinder block 12. To this end, both the fuel conduit 47 and lubricant conduit 44 have separate discharge ports 102 and 103, respectively, which are disposed in adjacent side by side relationship in the cylinder block 12 at the same vertical height in the cylinder bore 13. The ports 101 and 102 could also be staggered vertically relative to each other or in any desired relationship so long as they are maintained quite close to each other. This will ensure mixing on the piston skirt surface 35 and the desired viscosity to be obtained.

It should be readily apparent that the described embodiments of the invention are very effective in providing a lubrication system for a machine such as a two-cycle engine wherein it will be ensured that the lubricant is supplied adequately to the engine and yet in such a way that it cannot solidify or carbonize and cause sticking of the components. Of course, the foregoing description is that of preferred embodiments in the invention and various changes and modifications may be made without departing from the spirit and scope of the invention, as defined by the appended claims.

I claim:

1. A lubricating system for a ported machine comprised of a pair of relatively movable members defining at least one chamber having a volume which cyclically varies upon the relative movement between said members, at least one port formed in one of said members and opened and closed upon the relative movement of said members, means for introducing lubricant through one of said members for lubricating sliding surfaces of said members, and means for introducing a less viscous fluid through one of said members in proximity to the point where lubricant is introduced for controlling the viscosity of said lubricant.

2. The lubricating system of claim 1, wherein the ported machine comprises an internal combustion engine.

3. The lubricating system of claim 2, wherein the less viscous fluid is fuel.

4. The lubricating system of claim 3, wherein means are provided for supplying the fuel from the fuel source also to the engine for its combustion.

5. The lubricating system of claim 1, wherein the less viscous fluid and the lubricant are mixed before delivery to the sliding surfaces.

6. The lubricating system of claim 1, wherein the less viscous fuel and the lubricant are introduced separately to the sliding surfaces.

7. The lubricating system of claim 6, wherein the lubricant and less viscous fluid are delivered to the sliding surfaces in close proximity to each other for ensuring effective mixing.

8. The lubricating system of claim 1, further including means for sensing a condition of the machine and varying the ratio of lubricant and less viscous fluid in response to the sensed condition.

9. The lubricating system of claim 8, wherein the sensed condition also includes temperature and wherein the mixture is made less viscous at cold starting.

10. The lubricating system of claim 1, wherein the members comprise a cylinder block defining a cylinder bore and a piston reciprocating in the cylinder bore.

11. The lubricating system of claim 10, wherein the means for introducing the lubricant introduces the lubricant through the cylinder.

12. The lubricating system of claim 11, wherein the means for introducing the less viscous fluid also introduces the less viscous fluid through the cylinder.

13. The lubricating system of claim 10, wherein the ported machine comprises an internal combustion engine.

14. The lubricating system of claim 13, wherein the less viscous fluid is fuel.

15. The lubricating system of claim 14, wherein means are provided for supplying the fuel from the fuel source also to the engine for its combustion.

16. The lubricating system of claim 15, wherein the less viscous fluid and the lubricant are mixed before delivery to the sliding surfaces.

17. The lubricating system of claim 16, wherein the less viscous fuel and the lubricant are introduced separately to the sliding surfaces.

18. The lubricating system of claim 17, wherein the lubricant and less viscous fluid are delivered to the sliding surfaces in close proximity to each other for ensuring effective mixing.

* * * * *